United States Patent [19]

Radosay et al.

[11] 4,449,719
[45] May 22, 1984

[54] EMERGENCY SEAL

[75] Inventors: Jon J. Radosay, Morton Grove; John R. Wilson, Lisle, both of Ill.

[73] Assignee: John Crane Houdaille, Inc., Morton Grove, Ill.

[21] Appl. No.: 364,522

[22] Filed: Apr. 1, 1982

[51] Int. Cl.³ .................... E21B 33/06; F16J 9/00
[52] U.S. Cl. .................... 277/192; 251/1 R; 277/9
[58] Field of Search ............ 277/9, 9.5, 137, 199, 277/192; 251/1 B

[56] References Cited

U.S. PATENT DOCUMENTS

| 1,877,268 | 9/1932 | Cole | 277/9 |
| 3,318,605 | 5/1967 | Brown | 277/199 |
| 3,948,531 | 4/1976 | Mitrani | 277/9 |
| 3,994,472 | 11/1976 | Williams | 251/1 B |
| 4,332,367 | 6/1982 | Nelson | 277/192 |

FOREIGN PATENT DOCUMENTS 1014460 12/1965 United Kingdom ........... 251/1 B

*Primary Examiner*—Robert I. Smith
*Attorney, Agent, or Firm*—Haight, Hofeldt, Davis & Jambor

[57] ABSTRACT

A safety seal for a shaft passing through a housing. The seal is normally maintained in a non-sealing relationship to the shaft, but may be actuated during emergency conditions by levers. The seal includes an annular, split housing having a radially extending compartment which contains at least two seal members which are held together by a bias to define a seal annulus. The seal members are radially contracted into sealing engagement and expanded to a non-sealing position by cams or levers mounted in the seal members.

12 Claims, 7 Drawing Figures

EMERGENCY SEAL

BACKGROUND OF THE INVENTION

Bulkhead seals have long been used in the construction of ships. Such seals are normally installed between each bulkhead of a ship and the propeller shaft. Normally these seals have no function. They are held in a non-operative condition during which the main propeller shaft seal holds out the sea water. However, should the hull of the ship be ruptured, it is desirable to actuate the seal in adjacent bulkheads to preclude flooding of the separate compartments defined by the bulkheads. The non-flooded compartments will maintain the bouyancy of the ship.

U.S. Pat. No. 3,948,531 (Mitrani) illustrates one type of bulkhead seal. Seals made pursuant to this patent have been sold and are effective. However, our invention seeks to improve upon this seal in terms of lower cost, simplicity and ease of actuation.

SUMMARY OF THE INVENTION

Our bulkhead seal invention includes an annular housing which is assembled about a propeller shaft and affixed to the bulkhead. The housing defines a radially extending compartment which contains at least two segmented seal members which are held together by garter springs to define a seal annulus surrounding the shaft. A sealing ring formed of a hard elastomer or "teflon" extends about the internal circumference of the seal members. Cam means carried by the seal members effect relative movement of the seal members. Cam movement in one direction expands and retains the seal members out of contact with the shaft. Rotation of the cam in the opposite direction permits the garter spring to bias the seal members into emergency sealing engagement with the shaft.

Accordingly, our invention provides the following advantages:
1. Lower costs
2. Simplicity of installation and maintenance
3. Ease of actuation and deactivation
4. Better sealing capacity
5. Air-tightness, and
6. Reduced weight

DESCRIPTION OF THE DRAWINGS

The manner in which these and other objectives are attained is described in the following specification and drawing in which.

DETAILED DESCRIPTION OF THE INVENTION

Figure 1:
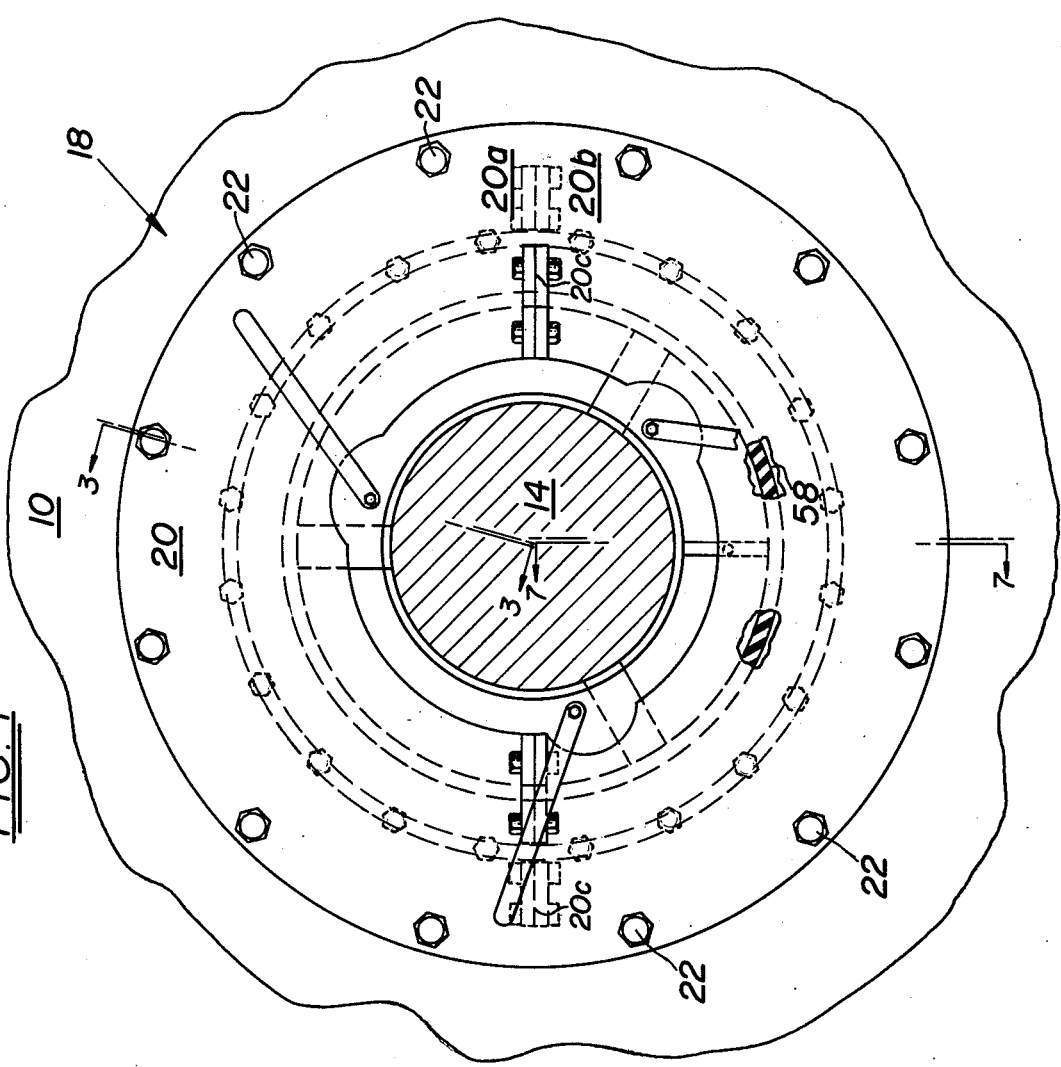
FIG. 1 is a front elevational view of the preferred embodiment of the invention.
Figure 2:
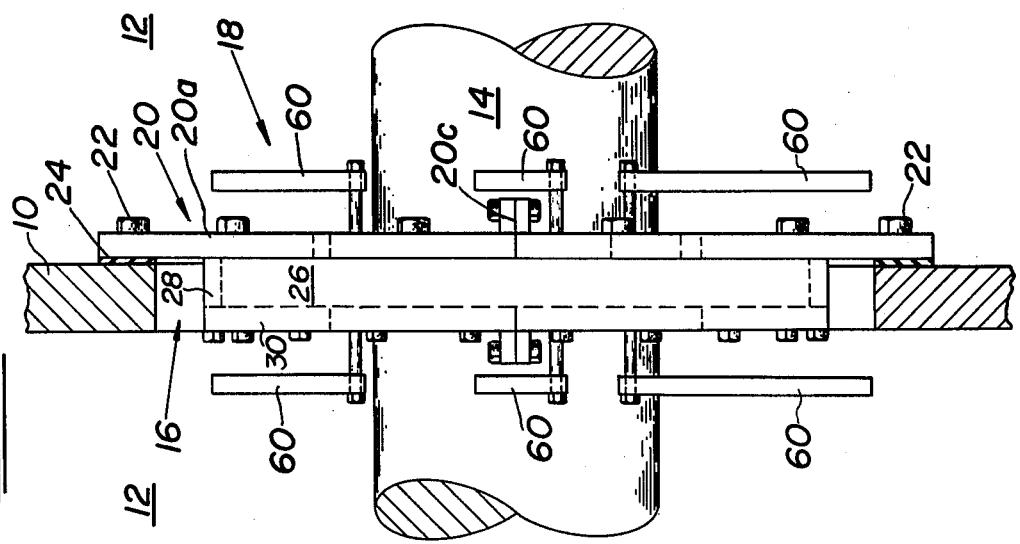
FIG. 2 is a side elevational view of the preferred embodiment.

The preferred embodiment of our invention is illustrated in the drawings in its intended application. This application is for ships and is generally illustrated by FIGS. 1 and 2. A plurality of bulkheads 10 divide the hold of the ship into compartments 12. A propeller shaft 14 passes through these bulkheads. Between the shaft 14 and the bulkhead 10 is an annular space 16 through which sea water can flow in the event of a rupture of the hull of the ship. To prevent this flow and consequent flooding of each compartment, a seal 18 is positioned in the annular space 16. Under normal conditions, the seal is in a non-actuated position, e.g., it is held out of contact with the shaft 14. No sea water is in the compartments 12 and there is no reason to impose friction drag or wear upon the shaft and seal. However, upon rupture of the hull of the ship, one of the compartments may be flooded. To seal off this sea water from other compartments, and to maintain the buoyancy of the ship, the seal 18 is activated to seal the annular space 16 and preclude further flow of water or air to other compartments 12.

The seal 18 is depicted in its actuated, sealing condition in FIGS. 1 and 2. It includes a split housing 20 formed of two semicircular sections 20 A and 20 B. The use of a split housing permits installation of the seal after the propeller shaft 14 has been installed. The section 20 A and 20 B are bolted together at 20 C and are affixed to the bulkhead by a plurality of bolts 22. A gasket 24 formed of conventional materials such as asbestos or elastomers may be positioned between the housing 20 and the bulkhead 10.

Figure 3:
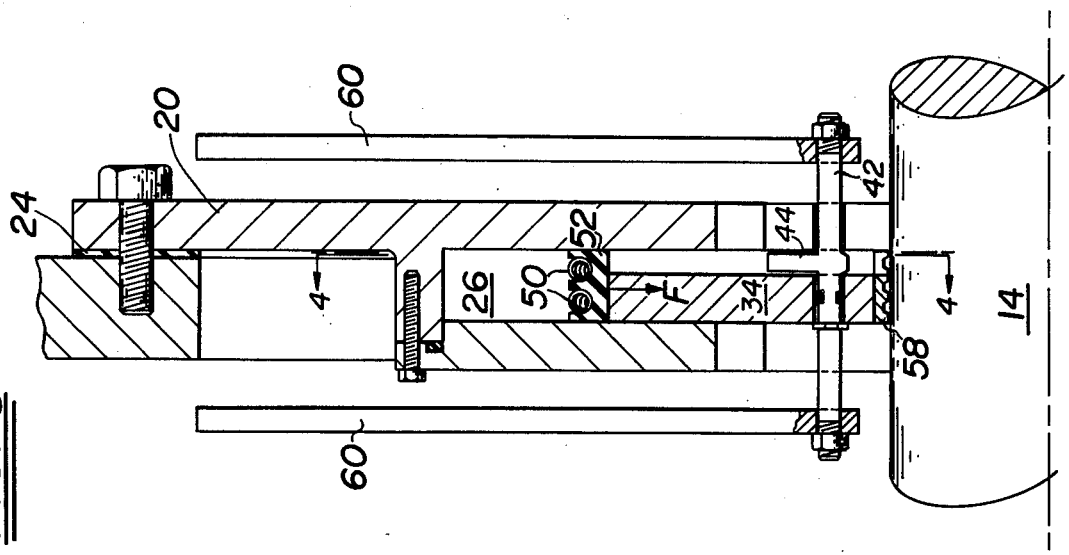
FIG. 3 is an elevational view, in section, taken along the lines 3—3 of FIG. 1.
Figure 6:
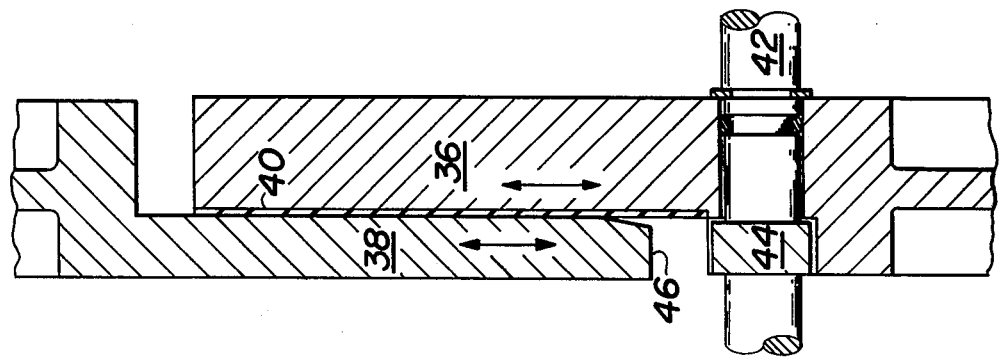
FIG. 6 is a sectional view taken along the lines 6—6 of FIG. 5.
Figure 4:
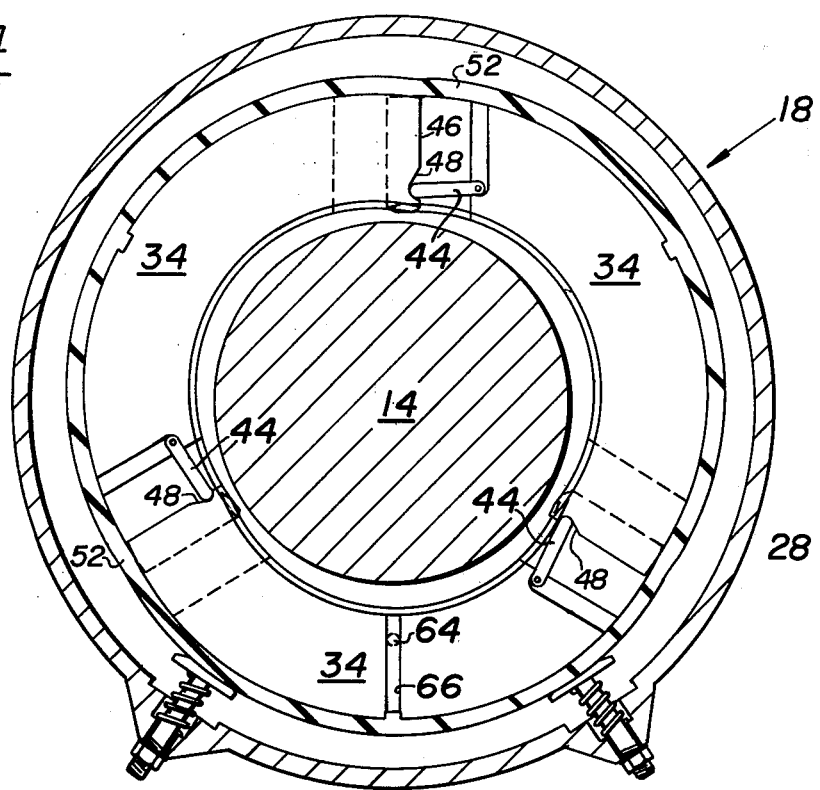
FIG. 4 is a front elevational view, in section, taken along the lines 4—4 of FIG. 3 depicting the seal in an expanded non-sealing relationship to the shaft.

The housing 20 is constructed to define a radially extending seal chamber or compartment 26 (see FIG. 2). This compartment is formed by the front member 26 A, an axially extending boss 28 and a rear flange 30. The compartment 26 houses three seal members 34, 34, 34 each of which define a segment of an annulus which circumscribes the shaft 14. These seal members are best illustrated in FIGS. 3, 4 and 6. Each seal member 34 extends approximately 120 degrees about the shaft. Their ends have extensions 36 and 38 of a reduced thickness which permits them to overlap one another as shown in FIG. 6. Between these overlapping extensions is a gasket 40 formed of conventional gasket material. Mounted in or adjacent each extension 36 is a rotatable member or cam shaft 42 which carries a cam 44. An O-ring and snap ring (unnumbered) may be used to seal and hold the cam shaft within extension 36. Rotation of the cam shaft 42 will cause the cam 44 to engage an end surface 46 of extension 38. Continued rotation of the cam 44 will result in relative movement of the two seal members 34 causing them to separate and expand the effective radius of a sealing annulus defined by the three seal members 34, 34, 34 to the position shown in FIG. 4. This movement is illustrated, in part, by arrows in FIG. 6. Preferably, the end surfaces 46 have a cam slot 48 which receives the end of cam 44 upon final movement of the cam. This slot 48 defines an over center position which locks the cams 44 and the seal members in a non-actuated, non-sealing position. The seal members will retain this position until an external force is applied to rotate cam members 44 in the opposite direction.

Rotation of the cams 44 in the opposite direction will remove the caming force separating the seal members 34, 34, 34. As this force is removed, a bias force urges the seal members radially inward. This bias force is provided by garter springs 50 which act through a molded elastomeric seal ring 52 mounted about the external circumference of the seal member 34. As shown in FIG. 3, these garter springs 50 exert an inward force F.

Figure 5:
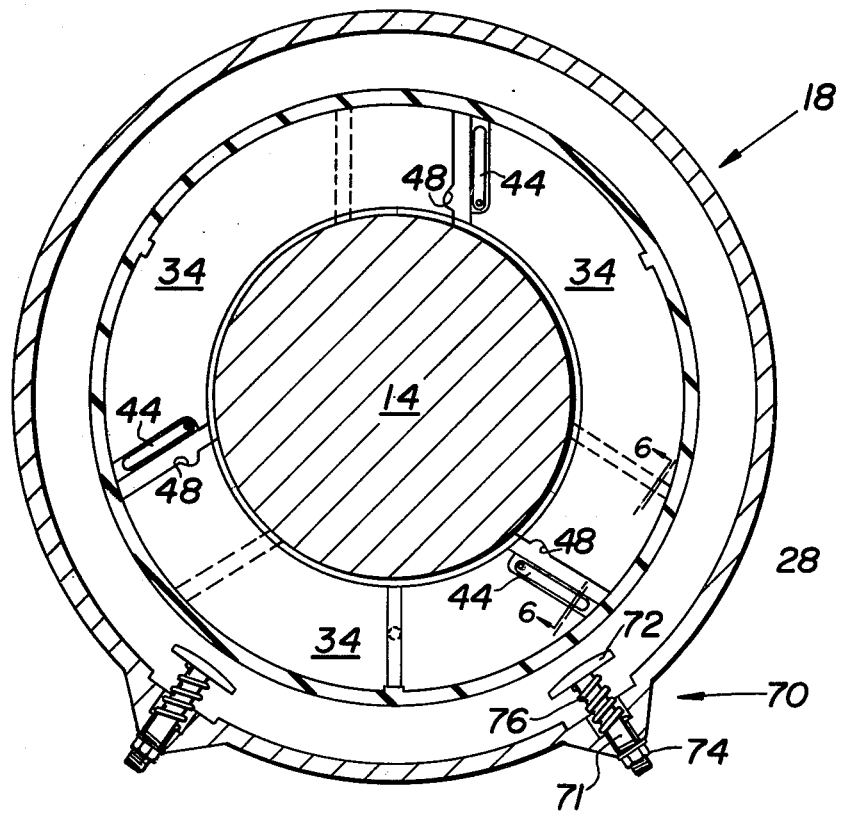
FIG. 5 is a view similar to that of FIG. 4 depicting the seal in a contracted, sealing relationship to the shaft.

The seal ring 52 is an extruded, elastomeric composition of a conventional type such as neoprene. Preferably, it is formed of three sections into a continuous ring as shown in FIGS. 4 and 5. If desired, bosses 54 may be formed on the internal diameter of each section to mate with locating recesses 56 in each seal member 34. This ring 52 provides stability and structural integrity to the annulus defined by the three seal members 34.

The internal circumference of the seal members carries a second seal ring 58. This ring is molded or machined, preferably of a hard, low friction elastomeric or teflon material and is attached to the internal circumference of the seal members 34 by screws or other means. The ring 58 is provided with lands and grooves. Only the lands engage the shaft upon radial inward movement of the seal members 34. The grooves may be filled with grease which will lubricate the contact surfaces of the lands with the shaft 14.

Thus, when the cams 44 are rotated clockwise (as viewed in FIG. 4), they will first cause a slight expansion of the seal members 34. However, continued rotation will disengage the cams 44 from surfaces 46 and permit the seal members to move relative to one another, contracting the radius of the annulus defined by seal members. This contracting movement results in the sealing condition depicted in FIG. 5 in which seal ring 58 has circumferentially engaged propeller shaft 14 and is held in sealing engagement with the shaft by the bias of springs 50. Thus water cannot flow along the shaft 14 from one compartment 12 to another. Moreover, seal ring 52 precludes fluid from flowing between these compartments through chamber 26. While fluid may pass into this chamber from a flooded compartment, seal ring 52 can be designed to preclude flow out of this chamber into the adjacent compartment 12. For example, each segment of ring 52 can be slightly oversized so that, upon actuation of the seal, the ends of each segment abut one another in sealing relation to define a circumferential seal. In addition, fluid pressure within chamber 26 will bias a lip (52 a and 52 b) into sealing engagement with the interior walls of chamber 26, thus precluding fluid flow from the chamber 26.

FIG. 4 represents the normal non-actuated condition of seal 18. To actuate the seal, cams 44 may be rotated by levers 60 affixed to both ends of the cam shafts 42 to permit seal actuation from either of the compartments 12, 12. Thus, upon rupture of the hull, the seal 18 may be actuated to preclude flooding through the bulkhead in either direction. When the rupture is repaired, the seal 18 may be disengaged by reverse (counter-clockwise) rotation of levers 60.

Figure 7:
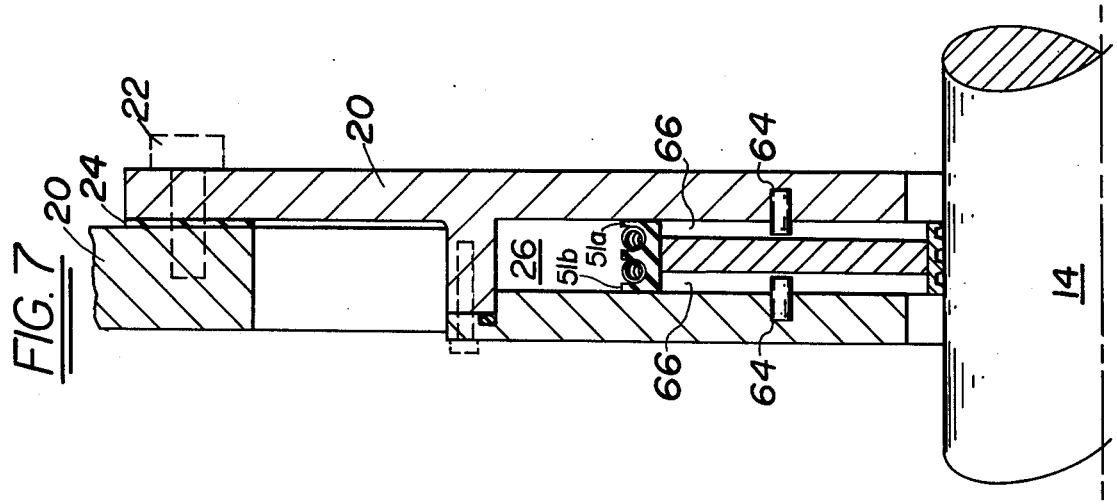
FIG. 7 is a sectional view taken along the lines 7—7 of FIG. 1.

Preferably, our invention includes two additional features. The first is a means to preclude rotation of the annulus defined by seal members 34 (see FIG. 7). This means may include pins 64 extending from the housing 20 into radial slots 66 which are formed into at least one of the seal members. This anti-rotation device is desirable when the seal 18 is engaged as shown in FIG. 5.

Another desirable feature of our invention is a centering device such as that shown in FIGS. 4 and 5. When the seal annulus is not engaged, two support assemblies 70, 70 hold the seal segments of the seal off of the shaft 14. Preferably, these centering devices take the form of a bolt 71 having a large head 72 upon which the seal annulus may rest. The bolts 71 extend through the boss 28 of housing 20 and are held in place by nuts or snap rings 74. Interposed between the head 72 and the boss 28 is a spring which resiliently supports the seal annulus.

Those skilled in the art will appreciate the advantages of our invention and the modifications which may be made. Among the advantages is a small force required to actuate the seal, its simplicity and desirable operating characteristics. With respect to modifications, such may include the selection of numerous alternative materials. Obviously, many of the parts may be cast. Too, the cams 44 may be replaced with various operating linkages such as toggle levers and other mechanisms. Similarly, our invention may be adapted to other uses and environments.

We claim:

1. A seal for selectively sealing the annular space between a housing and a rotatable shaft, said seal comprising;
   (a) an annular, split housing having two components adapted to be affixed about the shaft and to the housing;
   (b) said housing having radially extending flanges to define an annular, radially extending compartment in which seal members may be mounted for radial movement;
   (c) at least two seal members, each defining a sector or a circle mounted in said compartment, said seal members having a sealing means on their interior circumference for sealingly engaging the shaft; and gasket means for sealingly engaging one another and said compartment;
   (d) bias means extending about said seal members for urging said members into contact with said shaft; and
   (e) cam means carried by said seal members for engaging one another and, alternatively, caming said members against said bias means and away from said shaft, or, permitting said bias means to move said seal members into sealing engagement with said shaft.

2. A seal as recited in claim 1 which includes anti-rotation means interconnecting said housing with said seal members for precluding rotation of said seal members.

3. A seal as recited in claim 1 which includes centering means extending between said housing and said seal members for supporting said seal members concentric with said shaft when said seal members are not in sealing engagement with said shaft.

4. A seal as recited in claim 1 in which said cam means include a rotatable cam pivotally mounted near one end of said seal members and a reaction surface near the end of the adjacent seal members.

5. An apparatus as recited in claim 4 in which said reaction surface includes a detent position for said cam and for holding said seal members against said biasing means and away from said shaft.

6. An emergency seal for sealing the annular space between a bulkhead and a shaft passing through the bulkhead, said seal comprising:
   (a) an annular split seal housing having circular sections adapted to be positioned around said shaft and affixed to each other and to said bulkhead, said housing having a radially extending chamber;

(b) sector seal members positioned within said chamber, said members encircling said shaft and having a sealing surface for engaging said shaft in sealing contact;

(c) bias means urging said members radially inward into sealing contact with said shaft; and (d) cam means carried by each of said sector members near one end of said member, and reaction surfaces near the other end of each said member, the cam means of one sector member being adjacent to a reaction surface of another member for engaging said surface and, alternatively, radially expanding said segments against said bias means, or permitting said sector members to engage said shaft in sealing arrangement.

7. An apparatus as recited in claim 6 in which said seal includes means positioned between said housing and at least one of said seal members for constraining said seal members against rotation.

8. An apparatus as recited in claim 6 in which said seal includes means extending between said seal members and said housing for supporting said seal members concentric of said shaft.

9. An apparatus as recited in claim 6 in which said seal members are sealingly engaged with each other and with said housing by gasket material.

10. A seal for sealing the space between a housing and a shaft passing through the housing, said seal comprising (a) an annular support affixed to said housing and defining a chamber, (b) at least two seal sectors carried by said support in said chamber and defining an annular seal surrounding said shaft, said members having sealing means for sealingly engaging said shaft, (c) lever members extending between said seal sectors for enlarging the radius of said annular seal whereby the sealing means is out of contact with said shaft and for reducing the radius of said seal whereby the sealing means is in sealing engagement with said shaft.

11. A seal as recited in claim 10 which includes a circumferential biasing means urging said sectors into engagement with said shaft.

12. A seal as recited in claim 10 which includes a circumferential seal extending about the external circumference of said seal sectors to preclude fluid flow through said chamber.

* * * * *